United States Patent
Lee et al.

(10) Patent No.: US 8,391,222 B2
(45) Date of Patent: Mar. 5, 2013

(54) CHANNEL ASSIGNMENT FOR A WIRELESS NETWORK

(75) Inventors: Jung Gun Lee, Palo Alto, CA (US); Sungjoon Choi, Richmond (CA); Sung-Ju Lee, San Francisco, CA (US); Puneet Sharma, Palo Alto, CA (US); Taekyoung Kwon, Seoul (KR)

(73) Assignee: Hewlett-Packard Development Company, L.P., Houston, TX (US)

( * ) Notice: Subject to any disclaimer, the term of this patent is extended or adjusted under 35 U.S.C. 154(b) by 443 days.

(21) Appl. No.: 12/628,830

(22) Filed: Dec. 1, 2009

(65) Prior Publication Data

US 2011/0128920 A1     Jun. 2, 2011

(51) Int. Cl.
*H04W 72/04* (2009.01)
(52) U.S. Cl. ......... 370/329; 370/341; 370/348; 370/322
(58) Field of Classification Search .................. 370/329, 370/341, 348, 322

See application file for complete search history.

(56) References Cited

U.S. PATENT DOCUMENTS

| | | | |
|---|---|---|---|
| 2009/0010164 A1* | 1/2009 | Wang et al. | 370/235 |
| 2009/0040989 A1* | 2/2009 | da Costa et al. | 370/338 |
| 2009/0080377 A1* | 3/2009 | Ganguly et al. | 370/329 |

OTHER PUBLICATIONS

"Adaptive Channel Allocation for IEEE 802.11 Wireless LAN" by Lueng, 2006.*

* cited by examiner

*Primary Examiner* — Dang Ton
*Assistant Examiner* — Pamit Kaur (57) ABSTRACT

Channel assignment for access points (APs) in a wireless network includes determining a bottleneck client in an interference relationship, and determining a channel assignment for the APs that maximizes a normalized throughput of the bottleneck client. The normalized throughput is assigned to the bottleneck client, and the bottleneck client is assigned to a fixed set.

18 Claims, 5 Drawing Sheets

CHANNEL ASSIGNMENT FOR A WIRELESS NETWORK

BACKGROUND

A client in a wireless local area network (WLAN) associates with an access point (AP) to get connectivity, for example, to and from the Internet, and to further communicate with other clients via the WLAN. A client typically relies on one AP at any given time for all communications in the WLAN. Also, each AP in the WLAN is assigned a channel, and the clients connected to the AP use the channel to communicate with the AP. A channel may be a channel as defined by a standard, such as an 802.11 standard. The channel may be a frequency band.

When there are multiple APs, the channels used by each of the APs should be carefully assigned so that neighboring APs do not interfere with each other. Therefore, most channel assignment processes consider the interference relationship between APs. However, a client associated with an AP can interfere with another AP or can interfere with clients connected to different APs, even when the APs do not interfere with each other. Hence, conventional channel assignment processes are highly susceptible to interference caused by clients connected to neighboring APs, especially when the WLAN is dense. This can result in failed or degraded network performance that can seriously impact real-time applications, such as voice-over-IP or streaming video and also impact the performance of non-real-time applications.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

1. Overview

According to an embodiment, the effect of interference on throughput for each client is quantified using an air-time metric that takes into consideration the interference relationships between clients and APs. A channel assignment process, according to an embodiment, uses the air-time metric to assign channels to clients associated with APs to achieve a performance objective. For example, the channel assignment process, according to an embodiment, optimizes the air-time metric to improve fairness of throughput among different clients and/or for maximizing the overall throughput of the network by mitigating interference. This includes mitigating interference between clients and between a client and a neighboring AP.

Also, the channel assignment process may be used with different standards, including the 802.11n standard. 802.11n is an emerging WLAN technology that provides two channel bandwidth options, 20 MHz and 40 MHz. The 40 MHz channel enables an AP and its associated clients to communicate with each other by using two adjacent 20 MHz channels. Due to the increased (doubled) channel bandwidth, the AP and its clients benefit from the increased bandwidth. However, the wider channel also increases the potential for interference. The channel assignment process takes into consideration the effects (e.g., increased bitrate and increased interference) of channel bonding on the client throughput.

2. Inputs of Channel Assignment Process

The inputs for the channel assignment process include a set of APs, a set of clients connected to the APs, the AP-to-client associations, node-to-node interference relationships, and a set of available channels and the ratio of downlink and uplink traffic of each node. These inputs are predetermined prior to the execution of the channel assignment process and each input is described below.

2a. Sets of Clients and APs (i.e., Nodes)

A node is a client or AP in a wireless network such as a WLAN. Thus, the nodes include the APs and clients connected to the APs in the WLAN. An AP includes one or more clients connected to the AP. The clients connected to an AP are referred to as associated with the AP. As described below, a client communicates with only one AP at a given time and all clients associated with the same AP communicate on the same channel. The APs are wireless APs that allow clients to connect to the WLAN. The clients are wireless devices that include a wireless network interface (i.e., radio) that can communicate with the AP or other wireless devices using a predetermined standard, such as 802.11 or other standard.

The WLAN may be represented as an undirected graph $G=(V; E; L)$ where $V=\{v_1, \ldots v_n\}$ represents the set of all nodes in the WLAN; $E=\{e_1, \ldots e_m\}$ is the set of m bi-directional edges (AP-to-client associations) and L is the set of bi-directional interference links. The n nodes consist of two disjoint sets: a set of clients S and a set of APs A, where $A=V-S$. There are m clients out of all n nodes and the number of APs is n−m. Thus, n is always larger than m. An edge e only exists between an AP and a client and the edge means that the client is associated with the AP. Thus, each client has only one edge that connects to its associated AP and each client can communicate only with its AP unless the client disconnects with the AP and subsequently connects to another AP. Data communication takes place between an AP and its associated client. An AP and all its associated clients are operating in the same channel. Also, assume the AP-to-client association does not change during the channel assignment process.

2b. AP-to-Client Associations

Each client is associated with an AP to send and receive data in the WLAN, and thus, each AP may have one or more clients associated therewith. The AP-to-client associations are the client(s) associated with each AP. In one example, signal strength or other metrics may be used to determine which AP a client is to associate with. The standard being used in the WLAN may set forth a protocol for associating clients with an AP. In one embodiment, the AP-to-client associations do not change throughout the channel assignment. A cell is an AP and its associated clients. A cell is also referred to as a basic service set.

2c. Node-to-Node Interference Relationships

The interference relationships are predetermined. For example, clients interfere with each other if they are associated with different APs but communicate on the same channel and are in close enough proximity to "hear" each other's communications. The same may apply for APs that communicate on the same channel and are in close proximity.

A more formal description of interference relationships is as follows. If nodes $v_i$ and $v_j$ have an interference link $I_{i,j}$ that is an element of L, it means that they are interfering with each other when they are operating in the same channel. The interference link $I_{i,j}$ may be bi-directional. Note that the interference link is effective only when the two nodes $v_i$ and $v_j$ are in the same channel. When two nodes are operating in different channels, there is no interference between them.

2d. Ratio of Uplink and Downlink Traffic for Each Client

Each client i has a parameter $\alpha_i$ which is a function of the client's uplink and downlink traffic. Thus, downlink traffic: uplink traffic=$\alpha_i$:1-$\alpha_i$.

2e. Set of Available Channels

The set of available channels used by the channel assignment process may be setforth by the standard being used for the WLAN. The set of available channels is C, and the number of channels in the set is c. Because of 802.11n channel bonding, not all c channels are orthogonal. For example, given four orthogonal 20 MHz channels of {36; 40; 44; 48}, 802.11n allows two more bonded 40 MHz channels of {36+40; 44+48}. The possible channel bonding combinations are given by the 802.11n standard, such as 36+40 is possible but 40+44 is not. As a result, six channels in total (four 20 MHz channels and two 40 MHz channels) may be in the set of available channels. Interference can happen between two nodes if they are in the same channel or their channel share a common sub-channel. For instance, a node in 36 and another in 36+40 can interfere with each other. 36+40 and 44+48 are orthogonal.

The output of the channel assignment process is a channel assignment, which is a channel from the channel set assigned to each AP. The goal is to determine the best channel assignment that satisfies a given performance objective, such as maximizing throughput fairness amongst various clients or maximizing the aggregate throughput of the wireless network. The channel assignment includes assigning each AP a channel in the set of available channels.

3. Air Time and Normalized Throughput $f_i$ is a normalized throughput of client i. The normalized throughput is based on the air time which is normalized over time, as is described below. The normalized throughput is not the actual throughput. Also, the normalized throughput quantifies the impact of using either the 20 MHz channel or the 40 MHz bonded channel. For a 40 MHz bonded channel, the maximum normalized throughput increases by a gain factor, which is normally 1.6.

$t_i$ is the air time that a client i uses for its communication on the link to its associated AP. Air time is normalized over time. In one example it is the sum of transmission time (for uplink traffic) and reception time (for downlink traffic) of the client. For example, assuming the maximum air time is 1, a client sending and receiving 50% of the time on the channel would have an air time of 0.5. 802.11 MAC parameters such as frame size, bit rate, header size, and the other overhead times (e.g., acknowledgment) affect air time. $t_i$ is given by:

$t_i = f_i/G_{40MHz}$, (if a 40 MHz channel is assigned for client i); otherwise $t_i = f_i$ (if a 20 MHz channel is assigned for client i).

Because 40 MHz channel bonding provides a larger communication pipe than a 20 MHz channel by a factor of $G_{40MHz}$ (e.g., 1.6), the air time required to handle the traffic rate (throughput) $f_i$ is divided by $G_{40MHz}$. Because $t_i$ is a time normalized metric, $t_i$ cannot be larger than 1. However, $f_i$ can be larger than 1 if a 40 MHz channel is used. $tx_{STAi}$ is a transmission air time of client i and is given by:

$$tx_{STAi} = (1-\alpha_i)t_i$$

$tx_{APx}$ is a transmission air time of APx and is given by the sum of reception time of its associated stations:

$$tx_{APx} = \sum_{\forall i\ s.t.\ \exists e_{x,i}} \alpha_i t_i.$$

$tx_{CELLx}$ is the total transmission time of a CELL x, which is composed of APx and its all associated clients, and is given by:

$$tx_{CELLx} = tx_{APx} + \sum_{\forall i\ s.t.\ \exists e_{x,i}} tx_{STAxi} = \sum_{\forall i\ s.t.\ \exists e_{x,i}} t_i.$$

4. Interference Constraints

Interference constraints describe the interference relationships in the WLAN. The constraints are applied to identify bottleneck nodes and to determine the best channel assignment, as is further described with respect to the method below. The constraints are as follows.

Constraint 1 is that the sum of tx time in a cell is less than or equal to 1 and is represented by $$tx_{CELLx} \leq 1.$$

Constraint 2 is that if an $AP_x$ is interfered by $AP_y$, $AP_x$ can neither transmit nor receive while $AP_y$ is transmitting. Given constraint 2, $$tx_{CELLx} \leq 1 - tx_{APy}.$$

If $AP_y$ is interfered by not only $AP_x$ but some of $AP_x$'s clients, the constraint expands as:

$$tx_{CELLy} \leq 1 - tx_{APx} - \sum_{\forall i\ s.t.\ \exists e_{x,i}\&l_{y,i}} tx_{STAi}.$$

If bi-directional interference is assumed, two inequalities are generated from one interference link between APs. For example, if interference exists only between two APs $AP_x$ and $AP_y$ and there is no client involved in the interference, two inequalities are generated as follows:

$$tx_{CELLx} \leq 1 - tx_{APy};\ \text{and}$$

$$tx_{CELLy} \leq 1 - tx_{APx}.$$

Note that the interference relationships are only valid when both the interferer and the interfered are in the same channel. In other words, the constraint inequalities are calculated only when they operate in the same channel.

Constraint 3 is that if $AP_x$ interferes only with some clients in another cell y and not with $AP_y$, this decreases the air time of the interfered clients, but not the entire cell, as $AP_y$ can still communicate with its other interference-free clients. Constraint 3 is represented by, $$\sum_{\forall i \; s.t. \; \exists e_{y,i} \& l_{x,i}} t_{STAi} \leq tx_{APx}.$$

Constraint 4 considers a clique relation for carrier sensing. For example, APs x, y, z and client i sense each other, so they will not transmit at the same time, and the sum of their tx time will not exceed 1. The interference between clients is represented by this clique constraint as follows whereby j can be the AP index or the client index, $$\Sigma_{\forall j \; in \; a \; clique} tx_j \leq 1.$$

5. System

Figure 1:
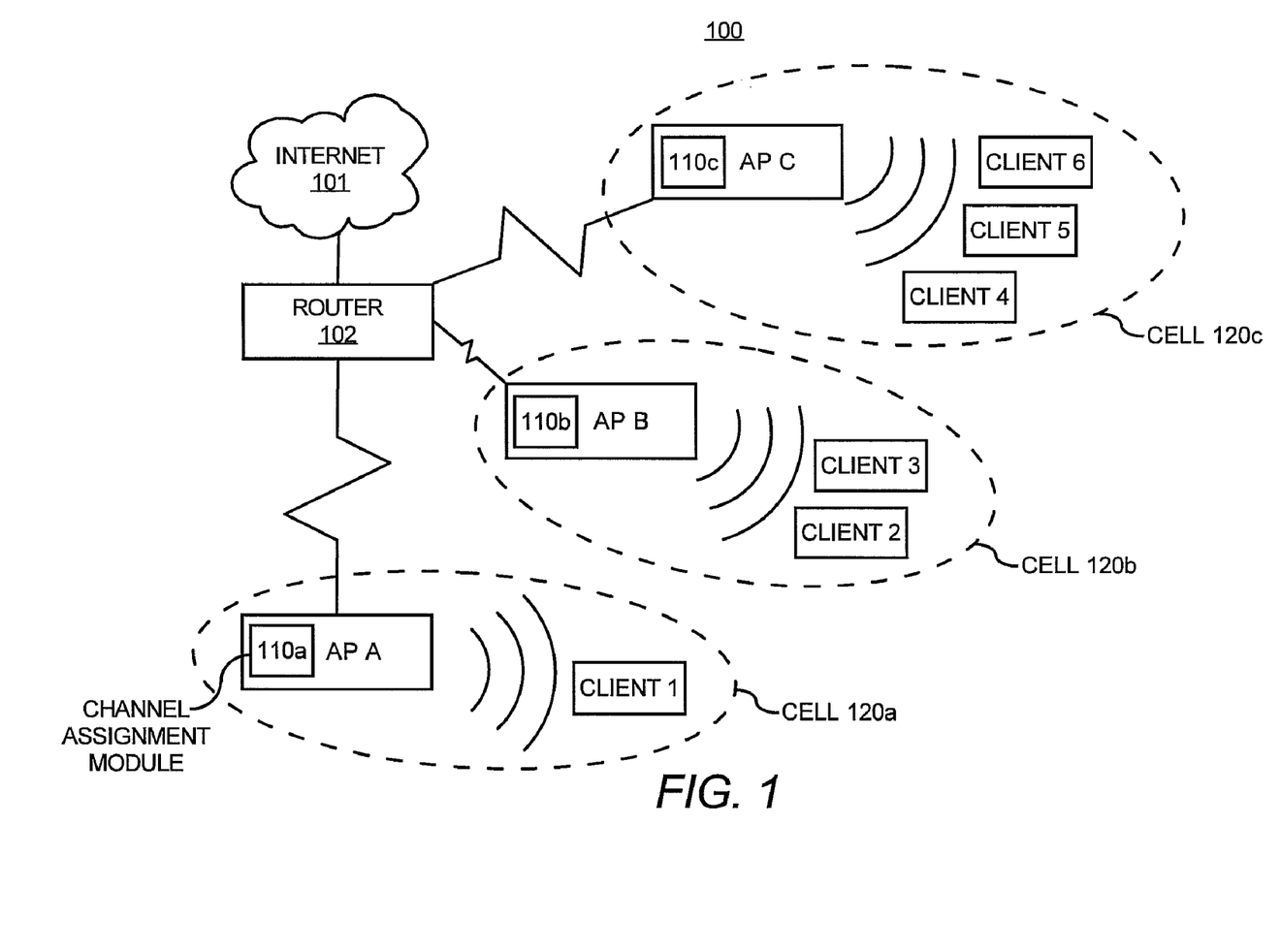
FIG. 1 shows a system, according to an embodiment of the present invention.

FIG. 1 illustrates a block diagram of a system 100, according to an embodiment of the present invention. The system 100 includes a WLAN 110 connected to the Internet 101. The WLAN 110 may be connected to an access network or any wide area network (WAN) or other network, and not just the Internet 101.

The WLAN 110 includes a router 102, multiple APs, shown as APs A-C, and multiple clients 1-6. Cells 120a-c, including an AP and its associated client(s) are shown. More or less than three APs, more routers and more or less clients may exist in the WLAN 110. The number of network devices shown is for illustration purposes.

An AP is a device that allows wireless communication devices, such as clients, to connect to a wireless network using a standard, such as an 802.11 standard or other type of standard. The APs A-C include network interfaces equipped for interfacing with the router 102, another network outside the WLAN 110 (e.g., the Internet or an access network) via the router 102, and the clients 1-6. The APs A-C may connect to the router 102 through a wireless or wired connection. A client is a device that can connect to a WLAN via a network interface, and may include an end user device, such as a laptop, desktop computer, cell phone, etc. The wireless network interface is commonly referred to as a radio.

In FIG. 1, each of the clients 1-6 is wirelessly connected to one of the APs A-C. The clients 1-6 may be connected to the Internet 101 via one of the APs A-C and the router 102. For example, the clients 1-6 may receive different types of data flows, such as VoIP, multiplayer game data, streaming video or audio, or bulk transfer of data.

The APs A-C include channel assignment modules 110a-c performing channel assignment among the APs A-C. The channel assignment modules 110a-c may determine air time and normalized throughput for channel assignment, as is further described below. The channel assignment modules 110a-c may perform the channel assignment process to assign channels to each of the APs A-C to minimize interference between APs and between clients and between clients and APs. In another embodiment, the channel assignment process may be performed by a central unit or server that gathers all the network information and assigns channels, and notifies the APs of the channel assignment.

6. Example

Interference relationships are identified through the constraints, and bottleneck nodes in the interference relationships are determined. This is shown by way of example in FIG. 2.

Figure 2:
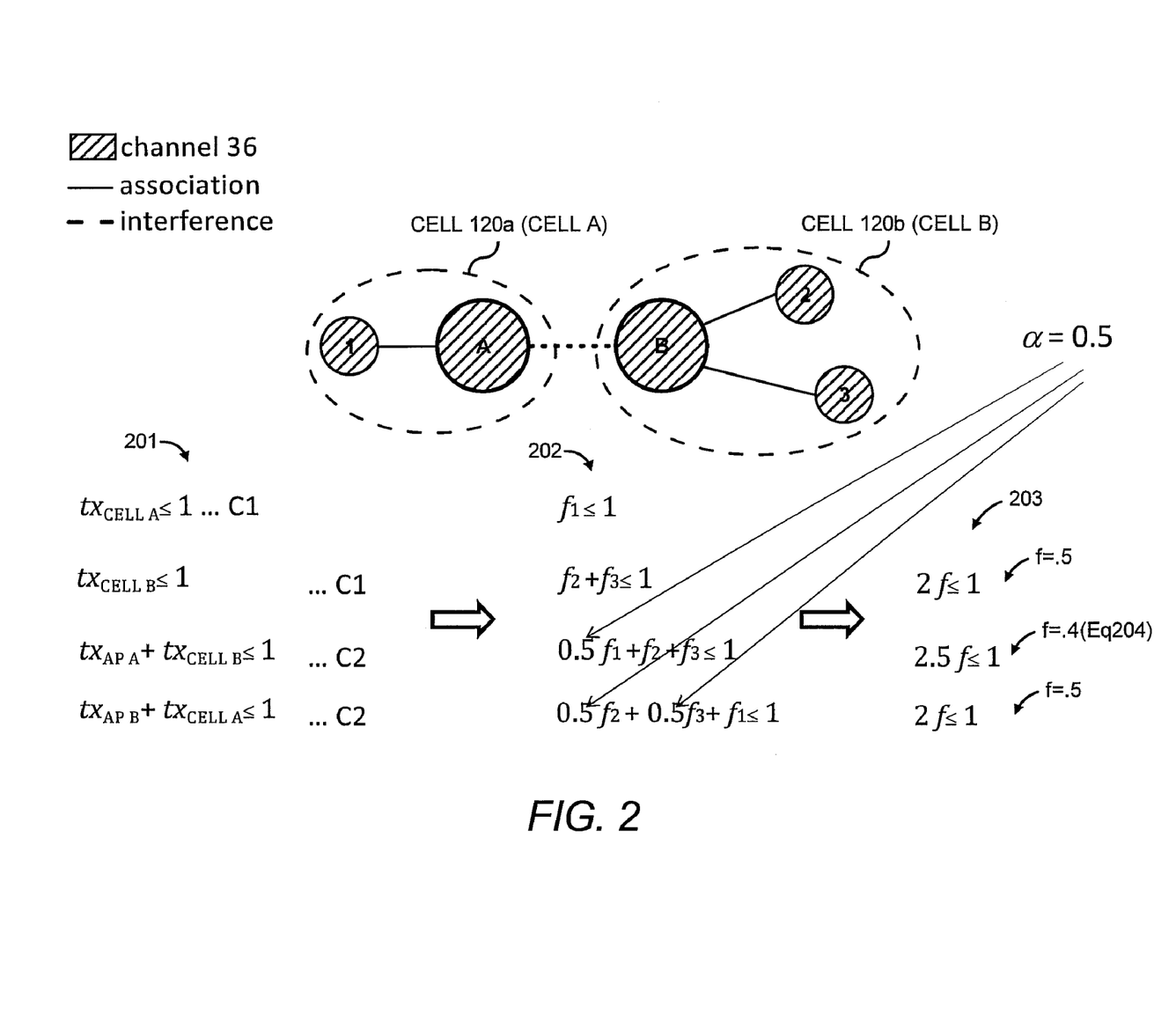
FIG. 2 shows an interference relationship, according to an embodiment of the present invention.

FIG. 2 illustrates an interference relationship between the cells 120a and 120b shown in FIG. 1. Assume the cells 120a and 120b are both using the same channel and there is interference between the cells. The channel for example is channel 36, but the channel may be a bonded channel such as 36+40. Also, client 1 is associated with AP A and clients 2 and 3 are associated with AP B.

One or more bottleneck nodes are determined for the interference relationship. A bottleneck node is a node with the smallest normalized throughput, i.e., $f_{min}$.

To determine the bottleneck node for the interference relationship, constraints 1 and 2 are applied which results in equations 201 shown in the left column. Assume $\alpha=0.5$ and given the equations described above for air time for cells and APs, the equations 201 convert to equations 202, where $f_i$ is the normalized throughput for the corresponding client i. Substitute f for $f_i$ to derive equations 203 from the equations 202. Then, it can be seen that the smallest value of f for the equations 203 is $f=1/2.5=0.4$, which is shown for equation 204. Thus, $f_{min}=0.4$, and the clients associated with $f_{min}$ are the clients associated with equation 204, which is clients 1-3 having normalized throughputs $f_1$-$f_3$, respectively. Thus, clients 1-3 are the bottleneck nodes.

Next, an iterative process is performed to determine the best channel assignment that maximizes $f_{min}$. Different channel assignments are applied until one is found that improves $f_{min}$ but does not reduce the normalized throughputs in the fixed set, which will be explained in the next paragraph. For example, an AP for one of the bottleneck nodes is selected and a new channel assignment is used (which changes the interference map) that gives that AP a new channel so it increases $f_{min}$ computed from the constraints but for the new channel on the AP.

Figure 4:
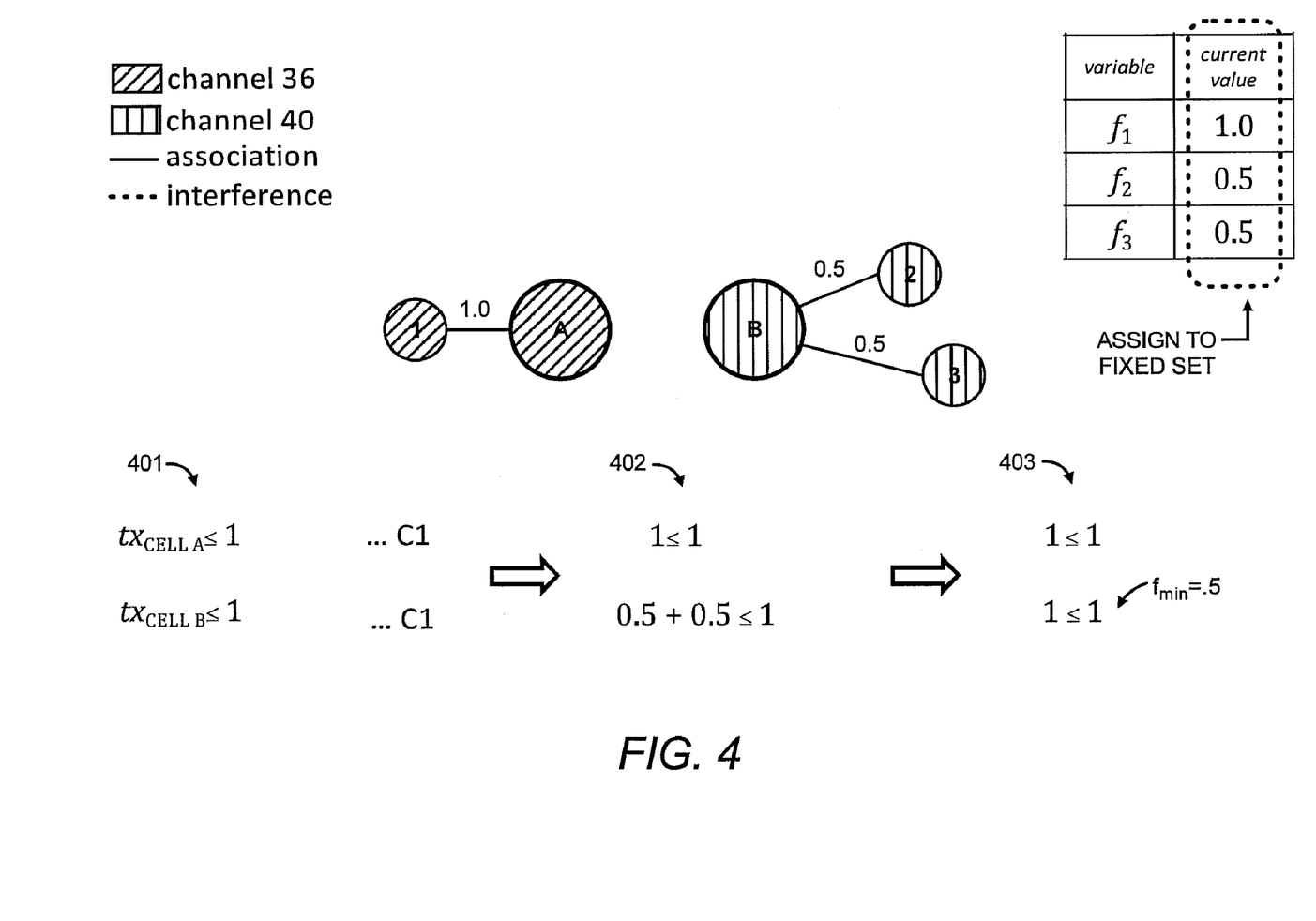
FIG. 4 shows normalized throughputs for a fixed set, according to an embodiment of the present invention.

Continuing with the example shown in FIG. 2, assume AP B is assigned to channel 40. Then, applying constraints 1 and 2 results in equations 301, from which equations 302 and then equations 303 are derived. The new $f_{min}$ is 0.5. Other channels assignments are applied until the maximum $f_{min}$ ($maxf_{min}$) is found. Assume the $maxf_{min}$ is 0.5. Then, the values for $f_1$, $f_2$, and $f_3$ are determined and assigned to a fixed set. This is shown in FIG. 4. $f_2$ and $f_3$ are assigned 0.5 because they were the normalized throughputs used to calculate $f_{min}=0.5$. Then, the maximum value that can be selected for $f_1$ is 1, so $f_1$ is also fixed to 1.

This process is repeated for each interference relationship until a channel assignment is found that determines the $maxf_{min}$ for each interference relationship while not reducing the throughputs in the fixed set. For example, $f_2$ and $f_3$ are assigned 0.5 in the fixed set. If a new channel assignment is found that improves $f_{min}$ for a new interference relationship (e.g., a cell in a new interference relationship) but reduces $f_2$ or $f_3$ below 0.5, that channel assignment cannot be used.

Figure 5:
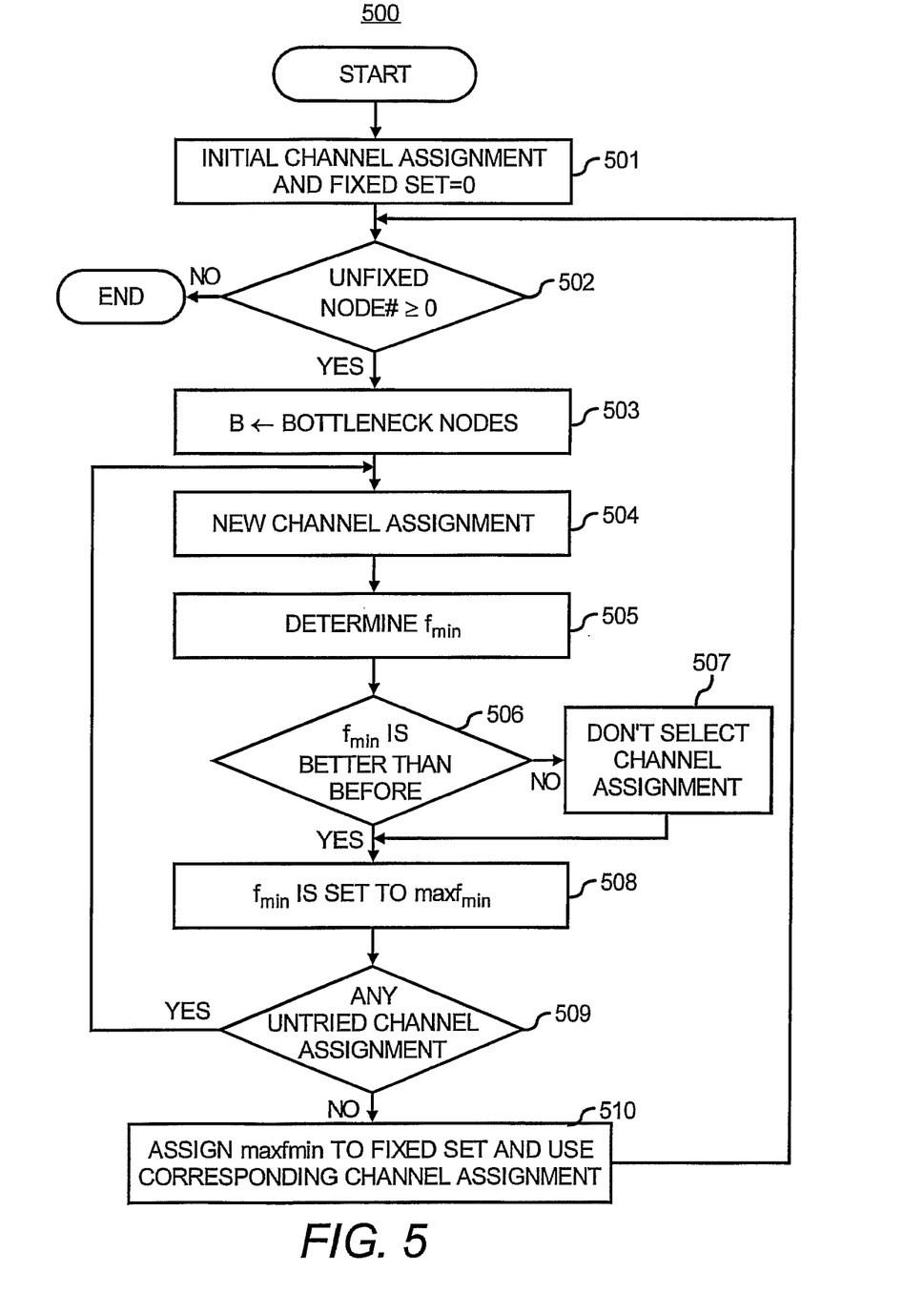
FIG. 5 illustrates a flowchart of a method for determining a channel assignment, according to an embodiment of the present invention.

FIG. 5 illustrates a flowchart of a method 500 for determining a channel assignment for APs in a wireless network, such as a WLAN, while mitigating interference. The method 500 assumes the clients are already associated with APs, and all clients associated with a particular AP communicate on the same channel and there is a given set of channels that are used for the channel assignment. The method 500 is described with respect to the system 100 shown in FIG. 1 and the examples described above by way of example and not limitation.

At step 501, an initial channel assignment is selected assigning a channel to each AP in the WLAN. Also, at this step, no nodes are assigned to the fixed set (i.e., fixed set=0). The channel assignment may be a random channel assignment. In one embodiment, the channel assignment includes assigning 802.11n bonded channels to APs and randomly assigning one of the 40 MHz bonded channels to each AP as an initial assignment.

At step 502, a determination is made as to whether any nodes in the WLAN have not been assigned to the fixed set. A node is assigned to the fixed set when its normalized throughput is assigned based on steps in the method 500. Thus, steps in the method 500 are repeated until all the normalized throughputs for the nodes are assigned.

At step 503, at least one bottleneck node is determined for an interference relationship, such as described with respect to FIG. 2. In one example, all the bottleneck nodes for all the interference relationships are determined by applying the constraints. Then, a subset of the bottleneck nodes is selected, and the steps 504-509 are iterated to find the maxf$_{min}$ for all the bottleneck nodes in the subset. The maxf$_{min}$ for each of the bottleneck nodes is applied to the fixed set at step 510, and the steps 504-509 are repeated for the remaining subsets of bottleneck nodes until all the bottleneck nodes are in the fixed set.

Figure 3:
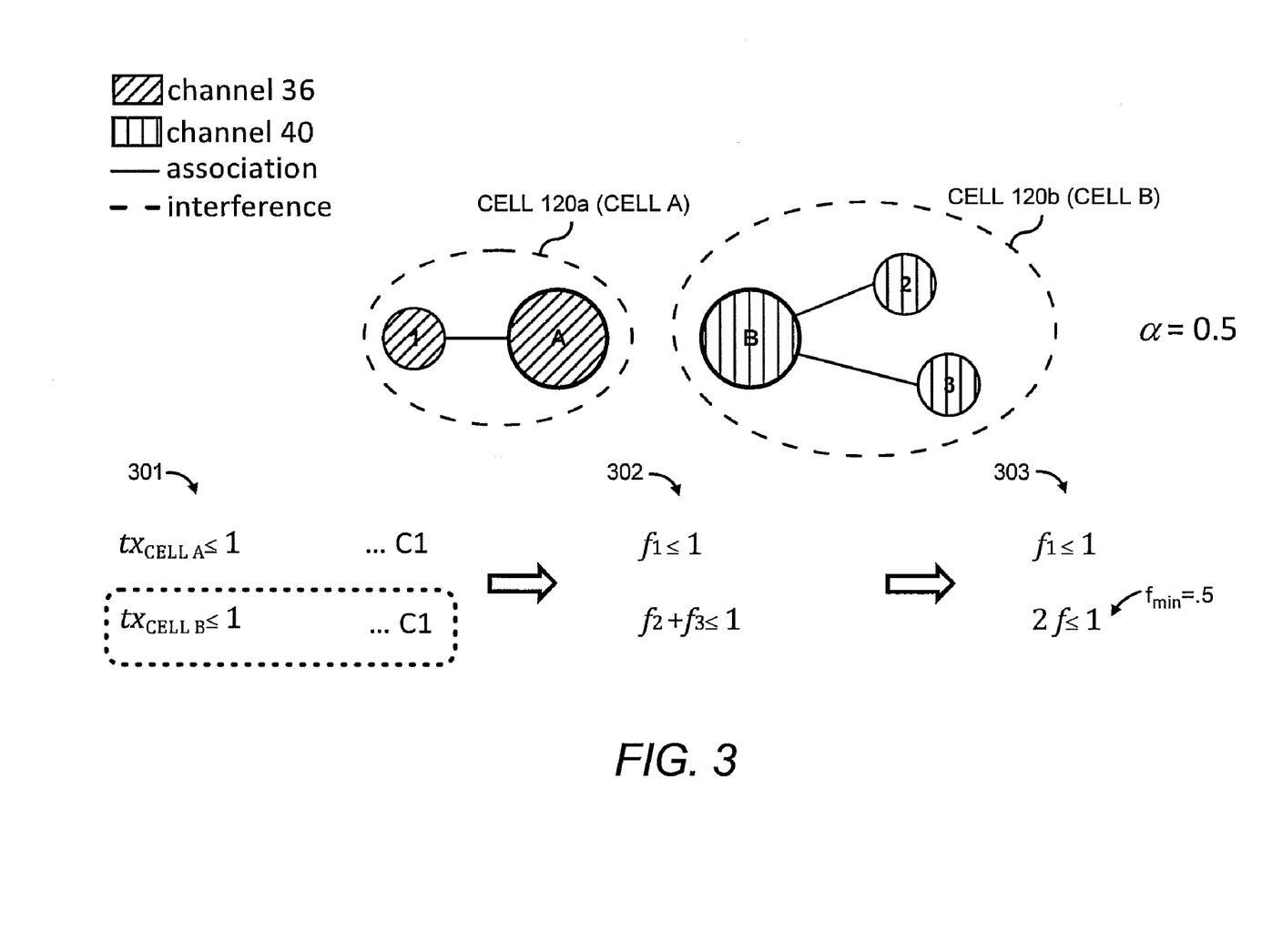
FIG. 3 shows a new channel assignment, according to an embodiment of the present invention.

At step 504, a new channel assignment is determined for the bottleneck nodes, such as described with respect to FIG. 3. For example, a new channel is assigned to one of the APs in the interference relationship. In one example, a channel assignment is selected that improves the throughput for the bottleneck nodes and their neighboring APs.

At step 505, an f$_{min}$ is determined for each of the bottleneck nodes given the new channel assignment by applying the constraints.

At step 506, a determination is made as to whether the f$_{min}$s determined at step 505 are better than any f$_{min}$s previously determined for the bottleneck nodes. For example, there may have been a previous iteration that determined the f$_{min}$ for the bottleneck node. If no, then the new channel assignment of step 504 is not selected at step 507. If yes, then f$_{min}$ becomes maxf$_{min}$.

At step 509, a determination is made as to whether any different channel assignments have not been tried. For example, there may be other channel assignments that can be used at step 504 that improve the throughput for the bottleneck nodes and their neighboring APs. If yes, then steps 504-506 are repeated. If no, then at step 510, the maxf$_{min}$ determined at step 508 is assigned to the fixed set, such as described with respect to FIG. 4. Then, the steps 502-510 are repeated for all remaining nodes whose f's are not fixed yet while maintaining all the maxf$_{min}$s in the fixed set. Then, the channel assignment selected at the last iteration for step 504 is the channel assignment applied to the APs.

The method 500 is performed by a computer system. In one embodiment, the method 500 may be performed by a single channel assignment module (e.g., channel assignment module 110a) in an AP or distributed among multiple channel assignment modules in multiple APs. In another embodiment, the method 500 is performed by a computer system other than AP.

7. Computer System

A computer system may be used as a platform to execute one or more computer programs performing the methods, steps and functions described herein. The one or more computer programs are stored in one or more computer readable storage mediums, which are storage devices.

The computer system may include a processor configured to execute the computer programs and memory storing the computer programs during runtime.

Some or all of the operations set forth in the methods and functions described herein may be contained as one or more computer programs stored in any desired computer readable storage medium and executed by a processor on a computer system. Exemplary computer readable storage media that may be used to store the software and may include Random Access Memory (RAM), Read Only Memory (ROM), Electrically Programmable Read Only Memory (EPROM), Electrically Erasable Programmable Read Only Memory (EEPROM), hard disks, or other data storage devices.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for assigning channels to access points (APs) in a wireless network, the method comprising:
    determining, by a computer system, at least one bottleneck client in an interference relationship, wherein the interference relationship is with a node in the wireless network or the interference relationship is between an AP associated with the bottleneck client and a node in the wireless network;
    determining a new channel assignment for a set of channels, wherein the new channel assignment includes different channels assigned to APs in the interference relationship;
    applying constraints to all APs and clients in the interference relationship;
    determining a normalized throughput for the at least one bottleneck client by applying the constraints;
    repeating the steps of determining a new channel assignment, applying constraints and determining the normalized throughput for different channel assignments until a maximum normalized throughput is determined;
    assigning the normalized throughput to the at least bottleneck client; and
    assigning the at least one bottleneck client to a fixed set of normalized throughputs.

2. The method of claim 1, further comprising:
    determining at least one next bottleneck client in a second interference relationship, wherein the second interference relationship is with a node in the wireless network or the second interference relationship is between an AP associated with the next bottleneck client and a node in the wireless network;
    determining a new channel assignment for the APs that maximizes the normalized throughput of the at least one next bottleneck client while maintaining the normalized throughput of all bottleneck clients in the fixed set; and
    assigning the at least one next bottleneck client to the fixed set.

3. The method of claim 2, further comprising:
    for another bottleneck client, repeating the steps of determining at least one next bottleneck client, determining a new channel assignment, and assigning the at least one next bottleneck client to the fixed set until a new channel assignment cannot be determined that improves the normalized throughput of the another bottleneck client while maintaining the normalized throughput of all bottleneck clients in the fixed set.

4. The method of claim 1, wherein determining at least one bottleneck client comprises:
identifying the interference relationship;
applying constraints to APs and clients in the interference relationship; and
determining the at least one bottleneck client by applying the constraints.

5. The method of claim 4, wherein the at least one bottleneck client has a smallest normalized throughput among a plurality of clients connected to APs in the interference relationship.

6. The method of claim 1, wherein assigning the normalized throughput to the at least bottleneck client comprises assigning the maximum normalized throughput to the at least one bottleneck client;
determining normalized throughputs for all other clients in the interference relationship based on the maximum normalized throughput of the at least one bottleneck client; and
assigning the at least one bottleneck client to a fixed set comprises assigning the maximum fmin of the at least one bottleneck client to the fixed set and assigning the normalized throughputs for all the other clients in the interference relationship to the fixed set.

7. The method of claim 1, wherein the constraints comprise a sum of transmission time in a cell is less than or equal to 1.

8. The method of claim 1, wherein the constraints comprise if an APx of the APs is interfered by APy, of the APs, APx can neither transmit nor receive while APy is transmitting.

9. The method of claim 1, wherein the constraints comprise if APx of cell x interferes only with some clients in another cell y and not with APy, this decreases the air time of the interfered clients, but not the entire cell, as APy and APy is operable to communicate with its other interference-free clients.

10. The method of claim 1, wherein the APs include APs x, y, z and the constraints comprise that if APs x, y, z and a client i sense each other, the APs x, y, z and the client i do not transmit at the same time, and the sum of tx time for the APs x, y, z and the client i does not exceed 1.

11. The method of claim 1, wherein the constraints comprise that all nodes in a cell communicate on a same channel and do not transmit simultaneously.

12. The method of claim 1, wherein a sum of normalized throughput in a cell is 1.

13. The method of claim 1, wherein the channel assignment includes at least one 802.11n bonded channel.

14. A computer system configured to assign channels to access points (APs) in a wireless network, the computer system comprising:
a data storage device storing a channel set and constraints; and
a processor configured to
determine at least one bottleneck client in an interference relationship, wherein the interference relationship is with a node in the wireless network or the interference relationship is between an AP associated with the bottleneck client and a node in the wireless network;
determine a new channel assignment for a set of channels, wherein the new channel assignment includes different channels assigned to APs in the interference relationship;
apply constraints to all APs and clients in the interference relationship;
determine a normalized throughput for the at least one bottleneck client by applying the constraints;
repeat the steps of determining a new channel assignment, applying constraints and determining the normalized throughput for different channel assignments until a maximum normalized throe h at is determined;
assign the normalized throughput to the at least bottleneck client; and
assign the at least one bottleneck client to a fixed set of normalized throughputs.

15. The computer system of claim 14, wherein the processor is configured to
for a next bottleneck client in another interference relationship, repeat steps of determining the next bottleneck client, determining a new channel assignment for the APs that maximizes the normalized throughput of the next bottleneck, and assigning the next bottleneck client to the fixed set until a new channel assignment cannot be determined that improves the normalized throughput of the next bottleneck client while maintaining the normalized throughput of all bottleneck clients in the fixed set.

16. The computer system of claim 14, wherein the at least one bottleneck client is determined by
identifying the interference relationship;
applying constraints to APs and clients in the interference relationship; and
determining the at least one bottleneck client by applying the constraints, wherein the at least one bottleneck client has a smallest normalized throughput among a plurality of clients connected to APs in the interference relationship.

17. A computer readable storage medium storing software that when executed by a processor performs a method for assigning channels to access points (APs) in a wireless network, the method comprising:
determining, by a computer system, at least one bottleneck client in an interference relationship, wherein the interference relationship is with a node in the wireless network or the interference relationship is between an AP associated with the bottleneck client and a node in the wireless network;
determining a new channel assignment for a set of channels, wherein the new channel assignment includes different channels assigned to APs in the interference relationship;
applying constraints to all APs and clients in the interference relationship;
determining a normalized throughput for the at least one bottleneck client by applying the constraints;
repeating the steps of determining a new channel assignment, applying constraints and determining the normalized throughput for different channel assignments until a maximum normalized throughput is determined;
assigning the normalized throughput to the at least bottleneck client; and
assigning the at least one bottleneck client to a fixed set of normalized throughputs.

18. The computer readable storage medium of claim 17, wherein the method further comprises:
determining at least one next bottleneck client in a second interference relationship, wherein the second interference relationship is with a node in the wireless network or the second interference relationship is between an AP associated with the next bottleneck client and a node in the wireless network;

determining a new channel assignment for the APs that maximizes the normalized throughput of the at least one next bottleneck client while maintaining the normalized throughput of all bottleneck clients in the fixed set; and assigning the at least one next bottleneck client to the fixed set.

* * * * *

UNITED STATES PATENT AND TRADEMARK OFFICE
CERTIFICATE OF CORRECTION

| | | |
|---|---|---|
| PATENT NO. | : 8,391,222 B2 | Page 1 of 1 |
| APPLICATION NO. | : 12/628830 | |
| DATED | : March 5, 2013 | |
| INVENTOR(S) | : Jung Gun Lee et al. | |

It is certified that error appears in the above-identified patent and that said Letters Patent is hereby corrected as shown below:

In the Claims:

In column 9, line 27, in Claim 6, delete "fmin" and insert -- normalized throughput --, therefor.

In column 10, line 12, in Claim 14, delete "throe h at" and insert -- throughput --, therefor.

In column 10, line 38, in Claim 17, delete "computer readable storage medium" and insert -- non-transitory computer readable medium --, therefor.

In column 10, line 64, in Claim 18, delete "computer readable storage medium" and insert -- non-transitory computer readable medium --, therefor.

Signed and Sealed this
Seventeenth Day of September, 2013

Teresa Stanek Rea
*Deputy Director of the United States Patent and Trademark Office*